(12) United States Patent
Kikuchi (10) Patent No.: US 10,218,439 B2
(45) Date of Patent: Feb. 26, 2019

(54) OPTICAL COMMUNICATION DEVICE, OPTICAL COMMUNICATION METHOD, AND NON-TRANSITORY RECORDING MEDIUM

(71) Applicant: CASIO COMPUTER CO., LTD., Shibuya-ku, Tokyo (JP)

(72) Inventor: Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/684,003

(22) Filed: Aug. 23, 2017

(65) Prior Publication Data
US 2018/0083702 A1 Mar. 22, 2018

(30) Foreign Application Priority Data
Sep. 20, 2016 (JP) .................................. 2016-183064

(51) Int. Cl.
| H04B 10/116 | (2013.01) |
| H04N 9/64 | (2006.01) |
| H04L 7/00 | (2006.01) |

(52) U.S. Cl.
CPC ........... *H04B 10/116* (2013.01); *H04N 9/643* (2013.01); *H04L 7/0075* (2013.01)

(58) Field of Classification Search
CPC ...... H04B 10/116; H04N 9/643; H04L 7/0075
USPC ......................................................... 398/118
See application file for complete search history.

(56) References Cited

U.S. PATENT DOCUMENTS

| 8,886,054 B2* | 11/2014 | Iizuka | ................ H04B 10/1129 398/172 |
| 9,008,520 B2* | 4/2015 | Yokoi | .................. H04B 10/116 398/118 |
| 2009/0226185 A1* | 9/2009 | Karstens | ............ H04B 10/5055 398/190 |
| 2010/0034540 A1* | 2/2010 | Togashi | ............... H04B 10/116 398/118 |
| 2010/0067916 A1* | 3/2010 | Suzuki | ................. H04B 10/116 398/130 |

(Continued)

FOREIGN PATENT DOCUMENTS

JP     2016038809 A     3/2016

OTHER PUBLICATIONS

Luna-Rivera, "Low-complexity colour-shift keying-based visible light communications system," IET Optoelectronics, year: 2015, vol. 9, Issue: 5, pp. 191-198.*

(Continued)

*Primary Examiner* — Juan A Torres
(74) *Attorney, Agent, or Firm* — Holtz, Holtz & Volek PC (57) ABSTRACT

A reception device acquires multiple frames for a period corresponding to an optical signal format and determines whether a color change region within the frames includes any of red (R), green (G), and blue (B), which is a first color, and black (Bk) in the non-emission period corresponding to a header, which is a second color. Moreover, when the color change region within the multiple frames for a period corresponding to an optical signal format includes any of red (R), green (G), and blue (B) and black (Bk), the reception device controls decoding of a bit data string corresponding to the red (R), green (G), and blue (B) colors in the color change region to acquire communication target information.

20 Claims, 8 Drawing Sheets

(56) References Cited

U.S. PATENT DOCUMENTS

| | | | | |
|---|---|---|---|---|
| 2011/0200338 A1* | 8/2011 | Yokoi | ................ | H04B 10/1149 |
| | | | | 398/158 |
| 2012/0328302 A1* | 12/2012 | Iizuka | ................ | H04B 10/1129 |
| | | | | 398/130 |
| 2013/0004184 A1* | 1/2013 | Jang | ................... | H04B 10/1149 |
| | | | | 398/172 |
| 2014/0193162 A1* | 7/2014 | Iizuka | ................ | H04B 10/1129 |
| | | | | 398/172 |
| 2017/0134633 A1* | 5/2017 | Reid | ................... | H04N 5/2356 |

OTHER PUBLICATIONS

Lukowski, "Widely Tunable High-Power Two-Color VECSELs for New Wavelength Generation." IEEE Journal of Selected Topics in Quantum Electronics year: 2015, vol. 21, Issue: 1.*

* cited by examiner

OPTICAL COMMUNICATION DEVICE, OPTICAL COMMUNICATION METHOD, AND NON-TRANSITORY RECORDING MEDIUM

CROSS-REFERENCE TO RELATED APPLICATION

This application claims the benefit of Japanese Patent Application No. 2016-183064, filed on Sep. 20, 2016, the entire disclosure of which is incorporated by reference herein.

FIELD

This application relates generally to an optical communication device, an optical communication method, and a non-transitory recording medium.

BACKGROUND

In information transfer using light (optical communication), the technique disclosed in Unexamined Japanese Patent Application Kokai Publication No. 2016-38809 is known. In detail, this technique is intended to acquire information corresponding to change in light emitted by a light source in a transmission device and included in images captured by a reception device in an optical communication system. In such an optical communication system, the non-emission period of the light source is used as the synchronization timing in some cases.

SUMMARY

An optical communication device according to the present disclosure includes:
an image acquirer that acquires images successively for a predetermined time; and
a determiner that determines in a predetermined cycle whether a predetermined image region in the images acquired by the image acquirer includes either one of a first color that includes visible light information defined by a predetermined visible light communication system and a second color that does not include the visible light information.

Moreover, an optical communication method according to the present disclosure includes:
an image acquisition step that acquires images successively for a predetermined time; and
a determination step that determines in a predetermined cycle whether a predetermined image region in the images acquired in the image acquisition step includes either one of a first color that includes visible light information defined by a predetermined visible light communication system and a second color that does not include the visible light information.

Moreover, a non-transitory recording medium according to the present disclosure is a non-transitory recording medium storing a computer-readable program for causing a computer to function as:
an image acquirer that acquires multiple images successively for a predetermined time; and
a determiner that determines in a predetermined cycle whether a predetermined image region in the images acquired by the image acquirer includes either one of a first color that includes visible light information defined by a predetermined visible light communication system and a second color that does not include the visible light information.

BRIEF DESCRIPTION OF THE DRAWINGS

A more complete understanding of this application can be obtained when the following detailed description is considered in conjunction with the following drawings, in which.

DETAILED DESCRIPTION

Figure 1:
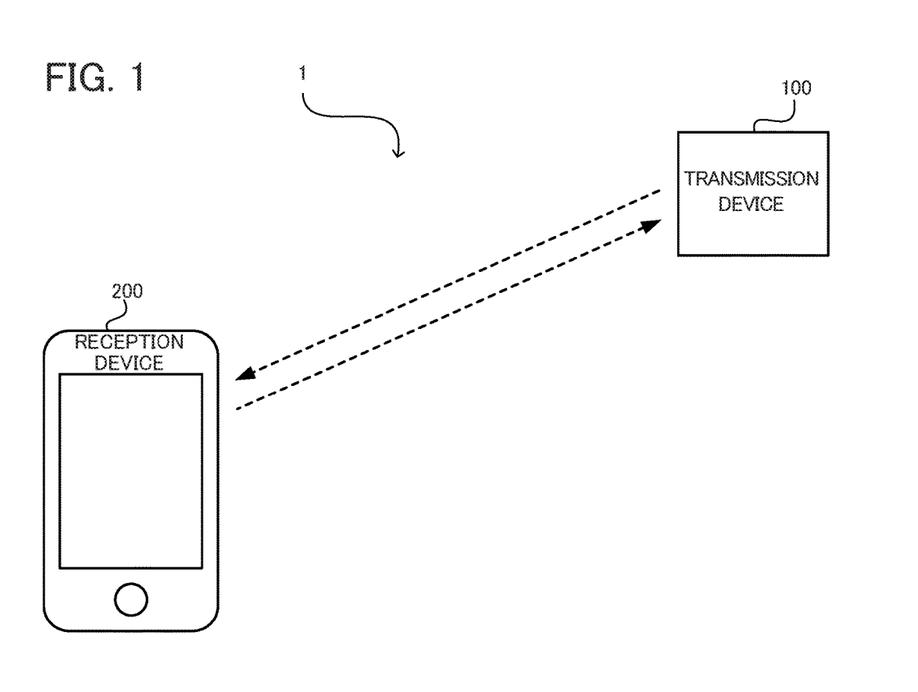
FIG. 1 is a drawing illustrating a configuration of an optical communication system according to an embodiment of the present disclosure.

An optical communication system according to an embodiment of the present disclosure will be described below. An optical communication system 1 according to an embodiment of the present disclosure comprises, as illustrated in FIG. 1, a transmission device 100 and a reception device 200.

In the optical communication system 1, the transmission device 100 and the reception device 200 can perform communication from the transmission device 100 to the reception device 200 using light as a communication medium.

The transmission device 100 converts communication target information to the reception device 200 to optical signals changing in a red (R), green (G), and blue (B) time-series manner by modulation and including black (Bk) in a header part that is the non-emission period, and outputs the optical signals.

The reception device 200 is, for example, a smartphone, and receives the optical signals from the transmission device 100 by capturing images of the transmission device 100 included in the imaging range. Moreover, the reception device 200 displays the images obtained by capturing the images. Moreover, the reception device 200 decodes and displays the communication target information from the received optical signals.

Figure 2:
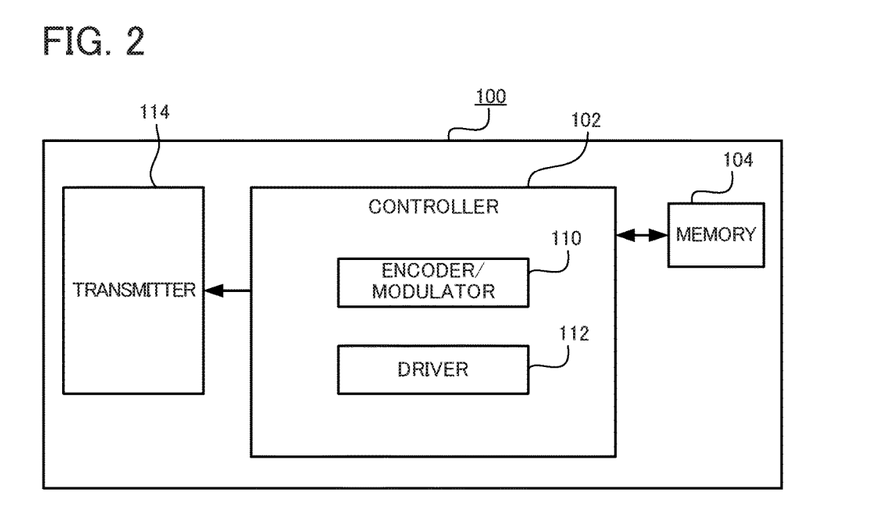
FIG. 2 is a diagram illustrating a configuration of a transmission device illustrated in FIG. 1.

The transmission device 100 will be described next. The transmission device 100 comprises, as illustrated in FIG. 2, a controller 102, a memory 104, and a transmitter 114.

The controller 102 comprises a central processing unit (CPU), executes software procedures according to programs saved in the memory 104, and functions to realize various functions provided to the transmission device 100.

The memory 104 is, for example, a random access memory (RAM) used as the work area and/or a read only memory (ROM) storing basic operation programs. The memory 104 stores various kinds of information (programs and the like) used for controls and the like in the transmission device 100.

An encoder/modulator 110 within the controller 102 encodes communication target information to a bit data string. Furthermore, the encoder/modulator 110 performs digital modulation based on the bit data string. As the modulation scheme, for example, 4 pulse position modulation (PPM) using a carrier wave of a frequency of 28.8 (kHz) is used. A driver 112 within the controller 102 controls the transmitter 114 to emit red (R), green (G), and blue (B) lights, which are lights of different wavelengths, at the same luminance while changing the color with time in a change cycle t1 and emit no light in the non-emission period corresponding to a header based on a predetermined optical signal format.

The transmitter 114 is, for example, a light emitting diode. The transmitter 114 outputs lights of red (R), green (G), and blue (B) wavelengths at the same luminance while changing the color with time in a change cycle t1 in the emission period and emits no light in the non-emission period corresponding to a header under the control of the driver 112.

Figure 3:
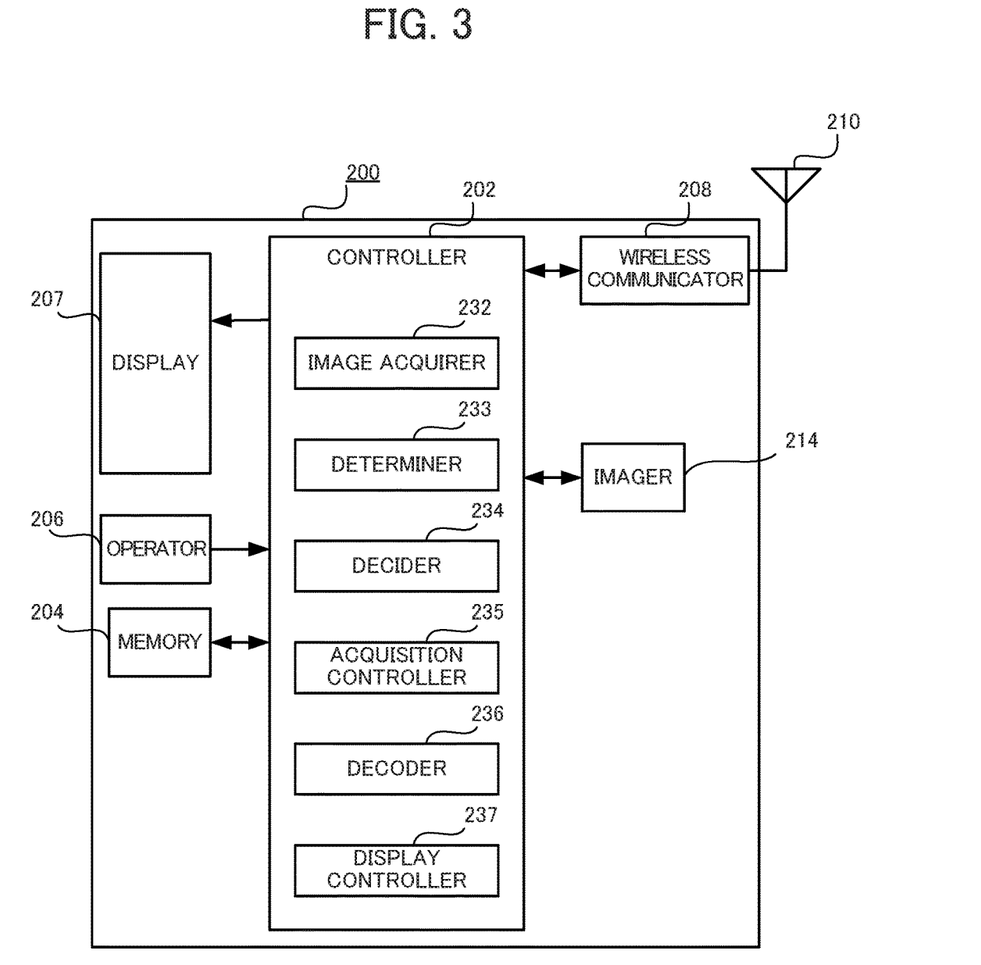
FIG. 3 is a diagram illustrating a configuration of a reception device illustrated in FIG. 1.

The reception device 200 will be described next. The reception device 200 displays captured images and functions as a communication device for receiving information from the transmission device 100. The reception device 200 comprises, as illustrated in FIG. 3, a controller 202, a memory 204, an operator 206, a display 207, a wireless communicator 208, an antenna 210, and an imager 214.

The controller 202 comprises a CPU. The controller 202 executes software procedures according to programs stored in the memory 204, thereby functioning to realize various functions provided to the reception device 200.

The memory 204 is, for example, a RAM and/or a ROM. The memory 204 stores various kinds of information (programs and the like) used for controls and the like in the reception device 200.

The operator 206 is a touch panel disposed on the top surface of a display region of the display 207 and serves an interface used for entering user operation contents. The display 207 comprises, for example, a liquid crystal display (LCD), a plasma display panel (PDP), an electroluminescence (EL) display, or the like, and displays images.

The wireless communicator 208 is configured by using, for example, a radio frequency (RF) circuit, a baseband (BB) circuit, or the like. The wireless communicator 208 transmits and receives radio signals via the antenna 210. Moreover, the wireless communicator 208 modulates transmission signals and demodulates reception signals.

The imager 214 is disposed on the opposite face of an enclosure of the reception device 200 to the face on which the display 207 is disposed. The imager 214 comprises a lens and a light receiving element. The lens comprises a zoom lens and the like and moves according to zooming control and focusing control by the controller 202. The imaging field angle and the optical image of the imager 214 are controlled by moving the lens. The light receiving element comprises multiple light receiving elements regularly arranged in a two-dimensional array on the light receiving plane. The light receiving element is, for example, an imaging device on which photodiodes and Bayer-arrayed color filters are mounted or an imaging device such as a three-charge coupled device (CCD) or a complementary metal oxide semiconductor (CMOS).

The imager 214 captures images in an imaging cycle t2 equal to the light change cycle t1 of the transmitter 114 within the transmission device 100 and with a time required for one shot (an exposure time) t3. The imager 214 captures an incident optical image (receives light) in a predetermined range of imaging field angle based on control signals from the controller 202 and sequentially outputs image signals within the imaging field angle to the controller 202.

Each time image signals are received from the imager 214, an image acquirer 232 within the controller 202 converts the image signals to digital data to generate a frame. As described above, in accordance with the imaging cycle t2 of the imager 214, the image acquirer 232 generates a frame in every time t2.

A determiner 233 within the controller 202 detects as a color change region a region of pixels of which the hue (H) sequentially changes to any of red (R), green (G), and blue (B) in multiple frames for a period corresponding to an optical signal format that are acquired successively in a time-series manner Here, if the position of a color change region changes in multiple frames, the determiner 233 can detect the color change region by following the positional change. Then, the determiner 233 acquires the hue, brightness, and saturation of the color change region in the multiple frames for a period corresponding to an optical signal format. Furthermore, the determiner 233 determines whether the colors of the color change region in the multiple frames for a period corresponding to an optical signal format include any of red (R), green (G), and blue (B) as the first color and black (Bk) as the second color corresponding to a header that is the non-emission period.

In the multiple frames for a period corresponding to an optical signal format, when the color change region includes any of red (R), green (G), and blue (B) and black (Bk), the determiner 233 stores in the memory 204 information of timing of the frame in which the color change region is black (Bk) as header timing information of the optical signals. Moreover, the determiner 233 stores in the memory 204 the hue, brightness, and saturation of the color change region in black (Bk) as the header color values.

A decider 234 within the controller 202 classifies the hue values of the color change region in the frames corresponding to the emission period into red (R), green (G), and blue (B) among the multiple frames for a period corresponding to an optical signal format. Then, the decider 234 calculates an average of the red (R) hue values, an average of the green (G) hue values, and an average of the blue (B) hue values. Furthermore, the decider 234 calculates and stores in the memory 204 each of an intermediate value between the average of the red (R) hue values and the average of the green (G) hue values as a red (R)–green (G) boundary value, an intermediate value between the average of the green (G) hue values and the average of the blue (B) hue values as a green (G)–blue (B) boundary value, and an intermediate value between the average of the blue (B) hue values and the average of the red (R) hue values as a blue (B)–red (R) boundary value.

When the image acquirer 232 generates frames, an acquisition controller 235 within the controller 202 controls the image acquirer 232 to start the generation with the first (header) frame among multiple frames for a period corresponding to an optical signal format based on the header timing information stored in the memory 204.

When the color change region includes any of red (R), green (G), and blue (B) and black (Bk) in the non-emission period corresponding to a header in the multiple frames for a period corresponding to an optical signal format, a decoder 236 within the controller 202 controls decoding of a bit data string corresponding to the red (R), green (G), and blue (B) to acquire the communication target information.

A display controller 237 within the controller 202 controls the display 207 to display images of the frames and images of the communication target information.

Figure 4:
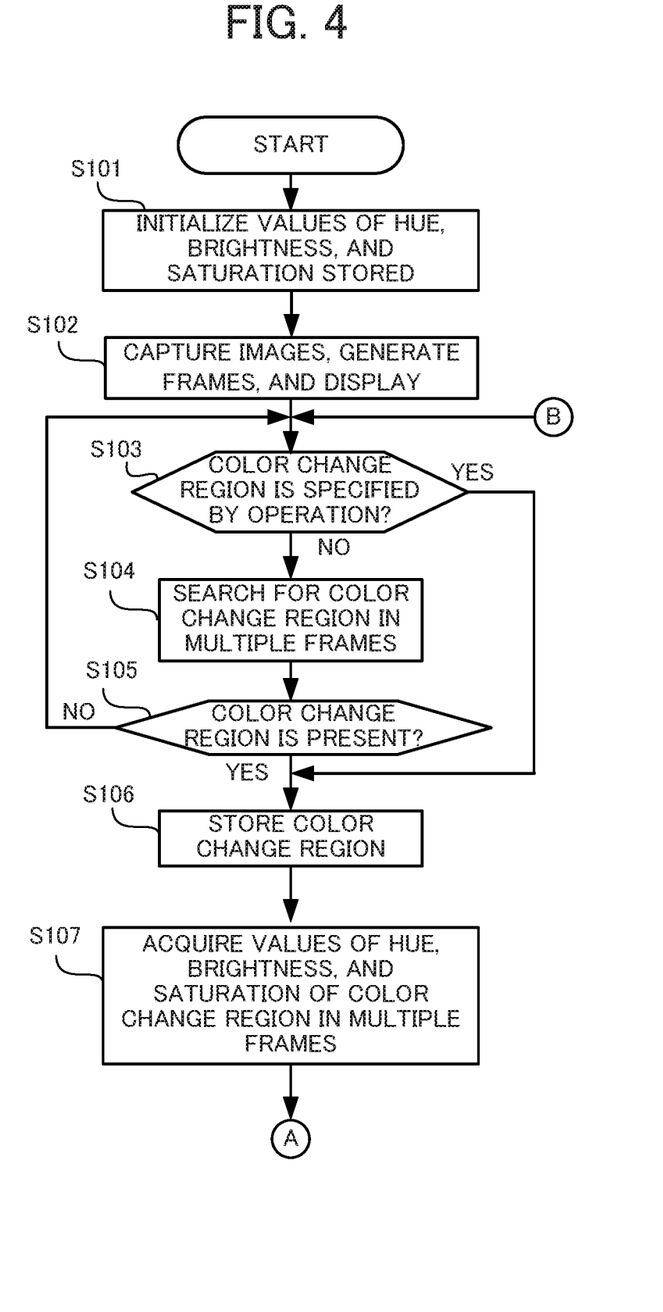
FIG. 4 is a first flowchart illustrating an operation of the reception device.
Figure 5:
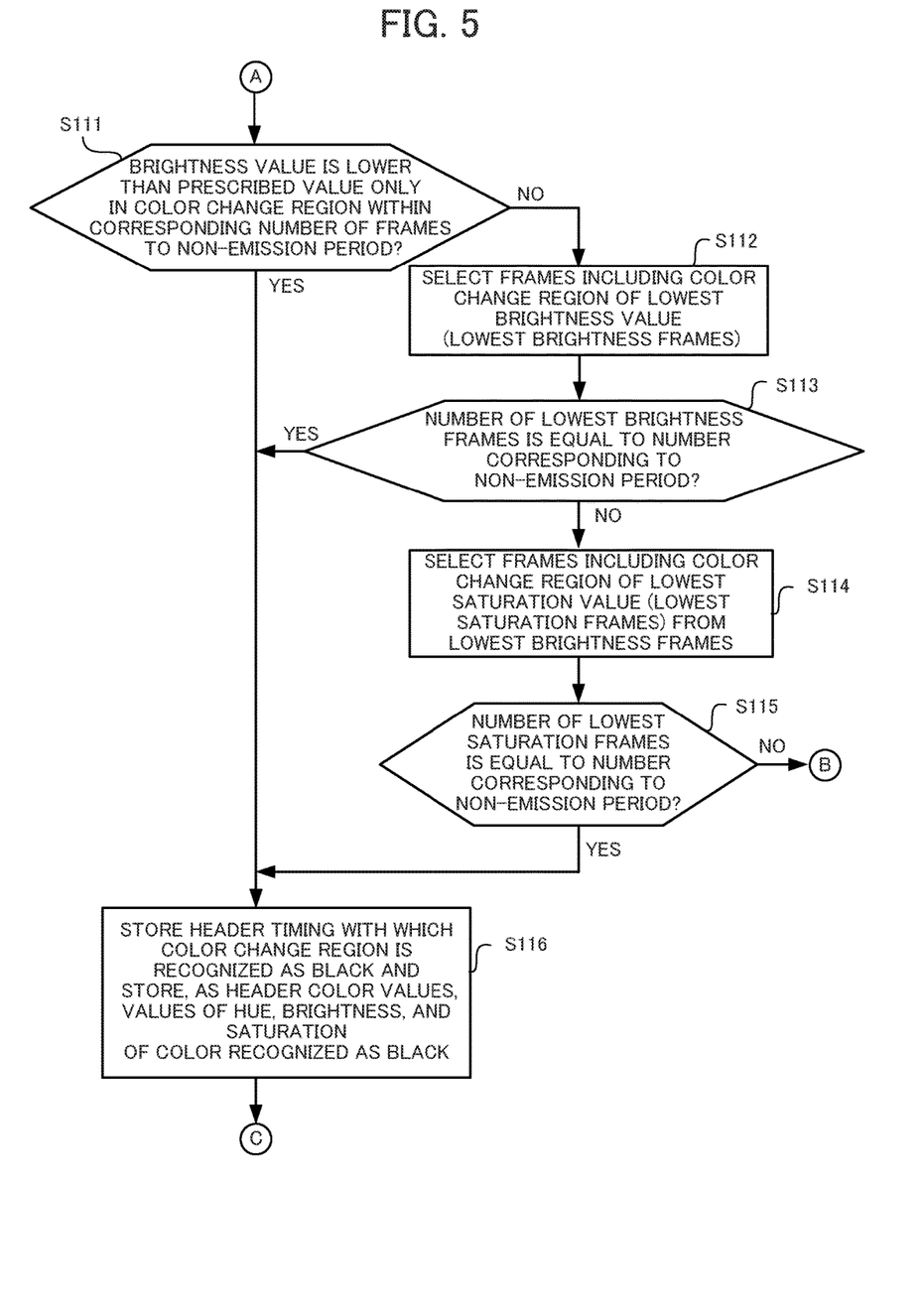
FIG. 5 is a second flowchart illustrating an operation of the reception device.
Figure 6:
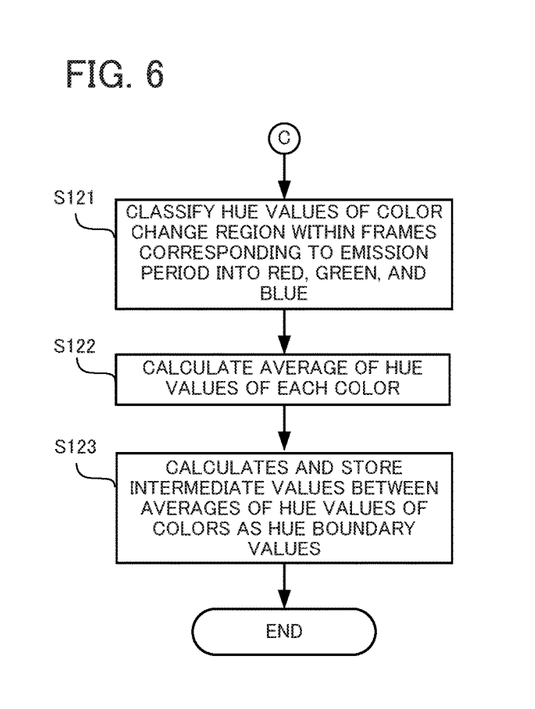
FIG. 6 is a third flowchart illustrating an operation of the reception device.

Operation of the reception device 200 will be described next. FIGS. 4 to 6 are flowcharts illustrating operation of the reception device 200.

Figure 7:
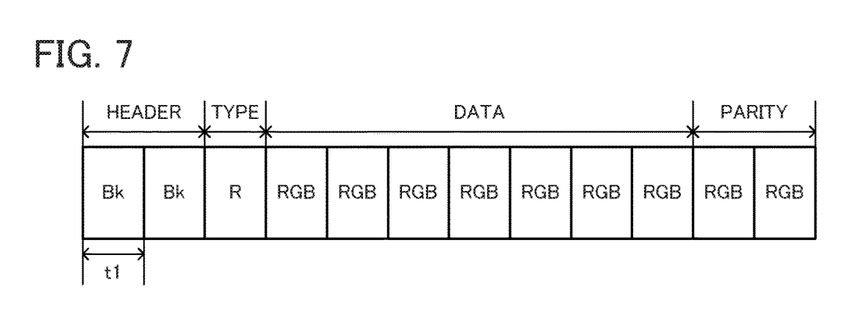
FIG. 7 is a chart illustrating one example of optical signal formats.

The transmission device 100 outputs optical signals corresponding to an optical signal format predetermined between the transmission device 100 and the reception device 200. FIG. 7 is a chart illustrating an exemplary optical signal format. Optical signals corresponding to the optical signal format illustrated in FIG. 7 comprise 12 light emission patterns of a time t1 (the change cycle t1). Specifically, the optical signals corresponding to the optical signal format illustrated in FIG. 7 include two black (Bk) light emission patterns in the non-emission period corresponding to a header, one red (R) light emission pattern corresponding to a type, seven light emission patterns in any of red (R), green (G), and blue (B) corresponding to data, and two light emission patterns in any of red (R), green (G), and blue (B) corresponding to a parity.

First, the controller 202 within the reception device 200 initializes the values of hue, brightness, and saturation stored in the memory 204 (Step S101). Subsequently, the imager 214 starts capturing images in the direction of the transmission device 100 and outputs image signals to the controller 202. Each time image signals are acquired from the imager 214, the image acquirer 232 within the controller 202 converts the image signals to digital data to generate a frame. The display controller 237 within the controller 202 controls display of the image of the generated frame on the display 207 (Step S102).

Then, the determiner 233 within the controller 202 determines whether a color change region within the frames is specified by an operation of the user of the reception device 200 (Step S103). For example, the user can specify a color change region by touching the operator 206 that is a touch panel disposed on the top surface of a display region of the display 207 while the images of the frames are displayed on the display 207. The determiner 233 detects the position specified by the user in the images of the frames based on an operation signal from the operator 206 and identifies the position as a color change region.

If no color change region within a frame is specified by an operation of the user of the reception device 200 (Step S103; NO), the determiner 233 searches for a color change region based on the multiple frames for a period corresponding to an optical signal format (Step S104).

Specifically, the determiner 233 acquires multiple frames for a period corresponding to an optical signal format from the image acquirer 232. In this embodiment, as described above, the optical signal change cycle is t1 and equal to the imaging cycle and the frame generation cycle, t2. Moreover, the optical signals corresponding to the optical signal format illustrated in FIG. 7 include 12 light emission patterns of a time t1 (the change cycle t1). Therefore, the number of multiple frames for a period corresponding to an optical signal format is 12. Furthermore, the determiner 233 detects as a color change region a region of pixels of which the color successively changes to any of red (R), green (G), and blue (B) in the multiple frames for a period corresponding to an optical signal format.

Then, the determiner 233 determines whether a color change region is present as a result of the processing of the Step S104 (Step S105). If no color change region is present (Step S105; NO), the operation of the Step S103 and subsequent steps are repeated.

On the other hand, if a color change region is present (Step S105; YES) or if a color change region is specified by an operation (Step S103; YES), then, the determiner 233 stores in the memory 204 information (for example, the coordinates) of the color change region in the frames (Step S106).

Then, the determiner 233 stores in the memory 204 the values of hue, brightness, and saturation of the color change region in each of the multiple frames for a period corresponding to an optical signal format (Step S107).

Figure 8:
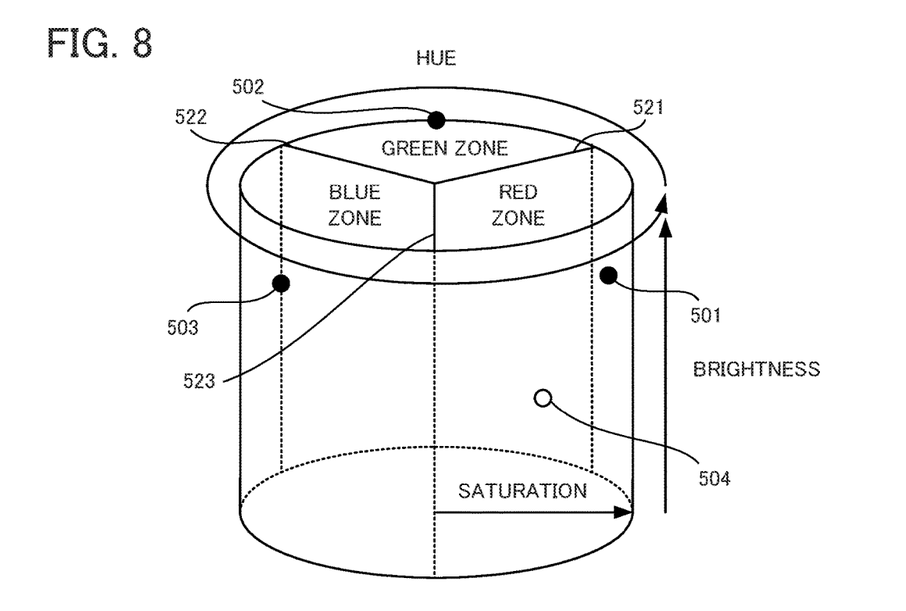
FIG. 8 is a chart illustrating one example of color spaces.
Figure 9:
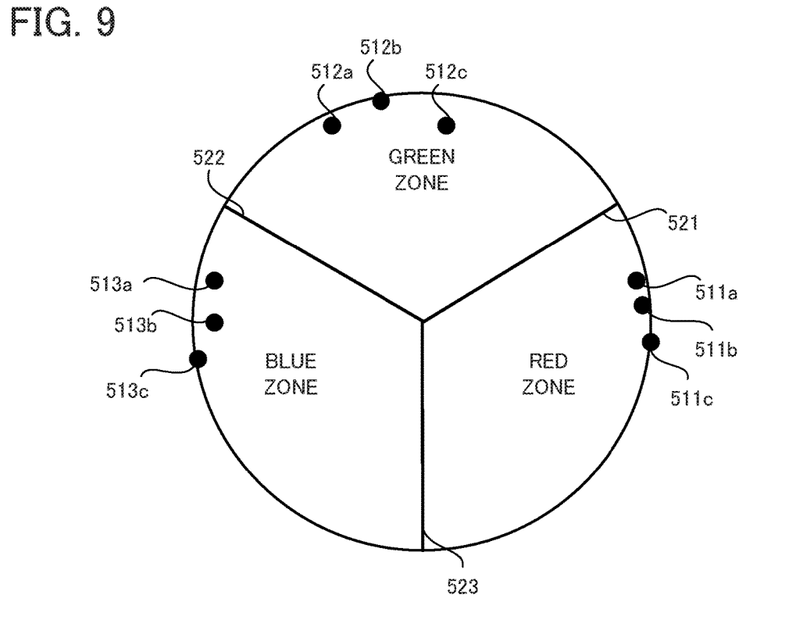
FIG. 9 is a chart illustrating one example of color planes.

FIG. 8 is a chart illustrating an exemplary color space. FIG. 9 is a chart illustrating an exemplary color plane. A color is specified by hue, brightness, and saturation and specified by a position in a column-shaped color space as illustrated in FIG. 8. In the color space of FIG. 8, the circumferential direction presents the hue, the height direction (vertical direction) presents the brightness, and the radial direction presents the saturation. Moreover, when the FIG. 8 is seen from above, the plane (color plane) illustrated in FIG. 9 is obtained. Red (R), green (G), and blue (B) are classified by the hue. In the initial state, the red (R)–green (G) hue boundary value is presented by a boundary value 521, the green (G)–blue (B) hue boundary value is presented by a boundary value 522, and the blue (B)–red (R) hue boundary value is presented by a boundary value 523.

After the processing of Step S107 in FIG. 4, shifting to operation illustrated in FIG. 5, the determiner 233 determines whether the brightness value is lower than a predetermined prescribed value only in the color change region within the corresponding number of frames to the non-emission period among the multiple frames for a period corresponding to an optical signal format (Step S111). In this embodiment, as described above, the optical signals corresponding to the optical signal format illustrated in FIG. 7 include two light emission patterns of the time t1 (the change cycle t1) in black (Bk) corresponding to a header that is the non-emission period, and the time t1 is equal to the imaging cycle and the frame generation cycle, t2. Therefore, the corresponding number of frames to the non-emission period means two frames.

Moreover, as illustrated in FIG. 8, red (R) 501, green (G) 502, and blue (B) 503 have greater brightness values while black (Bk) 504 has a lower brightness value. Therefore, if the brightness value is lower than a predetermined prescribed value only in the color change region within the corresponding number of frames to the non-emission period, the timing of the frames including the color change region of which the brightness value is lower than a prescribed value is the timing of the color change region being recognized as black (Bk) and this timing can be considered to be a header timing.

If the condition that the brightness value is lower than a predetermined prescribed value only in the color change region within the corresponding number of frames to the non-emission period is not satisfied (Step S111; NO), the determiner 233 selects frames within which the color change region has the lowest brightness value (lowest brightness frames) among the multiple frames for a period corresponding to an optical signal format (Step S112).

Then, the determiner 233 determines whether the number of lowest brightness frames selected in the Step S112 is equal to the number of frames corresponding to the non-emission period (Step S113). If the number of lowest brightness frames is equal to the number of frames corresponding to the non-emission period, the timing of the lowest brightness frames is the timing of the color change region being recognized as black (Bk) and this timing can be considered to be a header timing.

If the number of lowest brightness frames is not equal to the number of frames corresponding to the non-emission period (Step S113; NO), the determiner 233 selects frames within which the color change region has the lowest saturation value (lowest saturation frames) among the lowest brightness frames (Step S114).

Then, the determiner 233 determines whether the number of lowest saturation frames selected in the Step S114 is equal to the number of frames corresponding to the non-emission period (Step S115). As illustrated in FIG. 8, the red (R) 501, the green (G) 502, and the blue (B) 503 have greater saturation values while the black (Bk) has a lower saturation value. Therefore, if the number of lowest saturation frames is equal to the number of frames corresponding to the non-emission period, the timing of the lowest saturation frames is the timing of the color change region being recognized as black (Bk) and this timing can be considered to be a header timing.

If the number of lowest saturation frames is not equal to the number of frames corresponding to the non-emission period (Step S115; NO), the operation of the Step S103 in FIG. 4 and subsequent steps are repeated.

On the other hand, if the brightness value is lower than a predetermined prescribed value only in the color change region within the number of frames corresponding to the non-emission period (Step S111; YES), the determiner 233 assumes that the timing of the frames including the color change region of which the brightness value is lower than a prescribed value is a header timing with which the color change region is recognized as black (Bk) and stores information of the header timing in the memory 204. Moreover, the determiner 233 stores the values of hue, brightness, and saturation of the color of the color change region recognized as black (Bk) in the memory 204 as a header color (Step S116).

Moreover, if the number of lowest brightness frames is equal to the number of frames corresponding to the non-emission period (Step S113; YES), the determiner 233 assumes that the timing of the lowest brightness frames is a header timing with which the color change region is recognized as black (Bk) and stores information of the header timing in the memory 204. Moreover, the determiner 233 stores the values of hue, brightness, and saturation of the color of the color change region recognized as black (Bk) in the memory 204 as a header color (Step S116).

Moreover, if the number of lowest saturation frames is equal to the number of frames corresponding to the non-emission period (Step S115; YES), the determiner 233 assumes that the timing of the lowest saturation frames is a header timing with which the color change region is recognized as black (Bk) and stores information of the header timing in the memory 204. Moreover, the determiner 233 stores the values of hue, brightness, and saturation of the color of the color change region recognized as black (Bk) in the memory 204 as a header color (Step S116).

After the processing of Step S116 in FIG. 5, shifting to operation in FIG. 6, the decider 234 within the controller 202 classifies the hue values of the color change region in the frames corresponding to the emission period among the multiple frames for a period corresponding to an optical signal format into red (R), green (G), and blue (B) (Step S121). For example, in FIG. 9, the hue values of colors 511a, 511b, and 511c are included in the red zone and therefore determined to be red (R). Moreover, the hue values of colors 512a, 512b, and 512c are included in the green zone and therefore determined to be green (G). Moreover, the hues of colors 513a, 513b, and 513c are included in the blue zone and therefore determined to be blue (B).

Then, the decider 234 calculates an average of the hue values for each of red (R), green (G), and blue (B) (Step S122). For example, in FIG. 9, the decider 234 calculates an average of the hue values of the reds (R) 511a, 511b, and 511c, an average of the hue values of the greens (G) 512a, 512b, and 512c, and an average of the hue values of the blues (B) 513a, 513b, and 513c.

Figure 10:
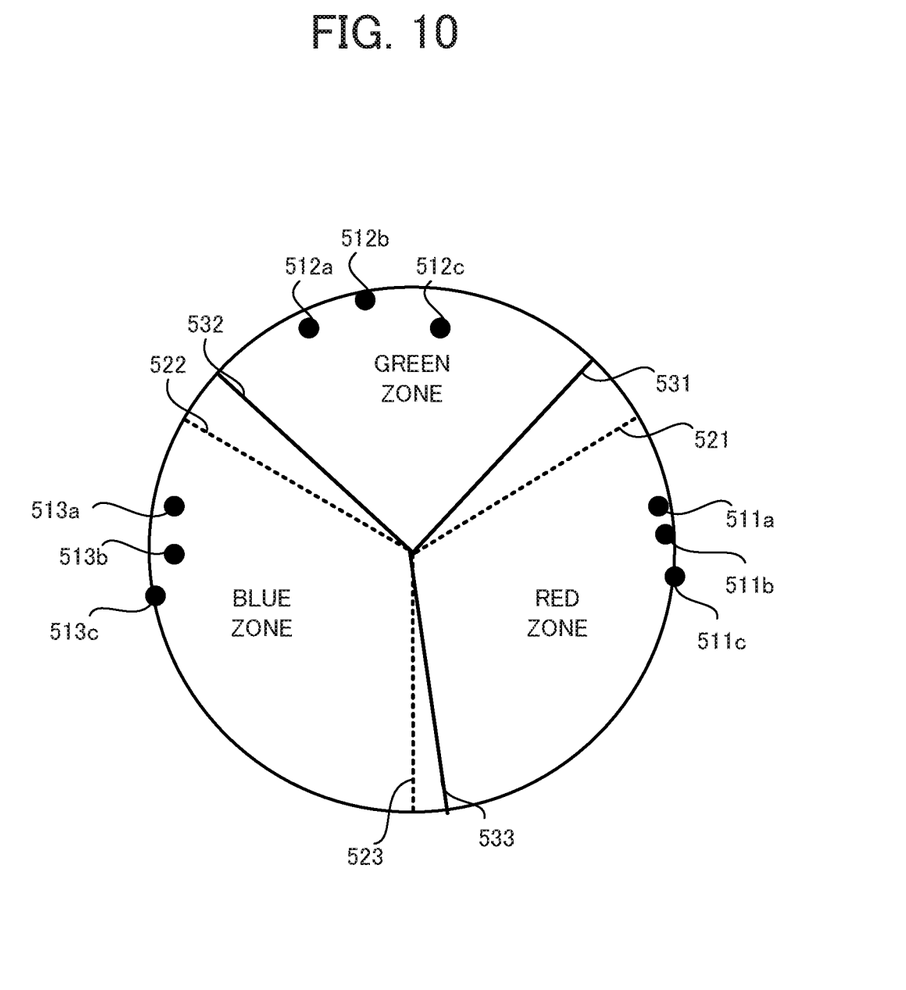
FIG. 10 is a chart illustrating one example of color boundaries on the color planes.

Then, the decider 234 calculates and stores in the memory 204 each of an intermediate value between the average of the red (R) hue values and the average of the green (G) hue values as a red (R)–green (G) hue boundary value, an intermediate value between the average of the green (G) hue values and the average of the blue (B) hue values as a green (G)–blue (B) hue boundary value, and an intermediate value between the average of the blue (B) hue values and the average of the red (R) hue values as a blue (B)–red (R) hue boundary value (Step S123). As a result, for example as illustrated in FIG. 10, the red (R)–green (G) hue boundary value is shifted to a new boundary value 531 from the initial state boundary value 521, the green (G)–blue (B) hue boundary value is shifted to a new boundary value 532 from the initial state boundary value 522, and the blue (B)–red (R) hue boundary value is shifted to a new boundary value 533 from the initial state boundary value 523.

After the operation in FIGS. 4 to 6 is executed, when the image acquirer 232 generates frames, the acquisition controller 235 within the controller 202 controls the image acquirer 232 to start the generation with the first frame among the multiple frames for a period corresponding to an optical signal format based on the header timing information stored in the memory 204.

Moreover, the decoder 236 within the controller 202 identifies the position of the color change region within the frames from information of the color change region stored in the memory 204. Furthermore, the decoder 236 determines in which color the color change region is, red (R), green (G), blue (B), or Black (Bk), in the multiple frames for a period corresponding to an optical signal format based on the hue, brightness, and saturation of the color of the color change region recognized as black (Bk) and the red (R)–green (G) hue boundary value, the green (G)–blue (B) hue boundary value, and the blue (B)–red (R) hue boundary value, which are stored in the memory 204, thereby controlling decoding of a bit data string corresponding to the red (R), green (G), and blue (B) colors to acquire the communication target information.

As described above, in the optical communication system 1 according to this embodiment, the reception device 200 acquires multiple frames for a period corresponding to an optical signal format and determines whether a color change region within these frames includes any of red (R), green (G), and blue (B), which is the first color, and black (Bk) in the non-emission period corresponding to a header, which is the second color. As a result, the reception device 200 can properly distinguish colors (an emission mode) in optical communication performed based on an optical signal format.

Moreover, when the color change region within the multiple frames for a period corresponding to an optical signal format includes any of red (R), green (G), and blue (B) and black (Bk), the reception device 200 controls decoding of a bit data string corresponding to the red (R), green (G), and blue (B) colors in the color change region to acquire the communication target information. As a result, the reception device 200 can acquire information corresponding to the colors properly distinguished in optical communication.

Moreover, the reception device 200 determines whether the color change region includes any of red (R), green (G), and blue (B) and black (Bk) based on the hue, brightness, and saturation of the color change region. As a result, the reception device 200 can properly distinguish the colors in optical communication.

Moreover, the reception device 200 determines that the color change region is black (Bk) when the brightness of the color change region is lower than a prescribed value. Distinguishing black (Bk) based on the brightness value, the reception device 200 can properly distinguish red (R), green (G), and blue (B) from black (Bk).

Moreover, the reception device 200 determines that the lowest brightness value color in the color change region within the multiple frames for a period corresponding to an optical signal format is black (Bk) in the non-emission period corresponding to a header when the condition that the brightness value is lower than a predetermined prescribed value only in the color change region within the corresponding number of frames to the non-emission period is not satisfied. As just stated, the reception device 200 can properly distinguish red (R), green (G), and blue (B) from black (Bk) by determining that the lowest brightness color is black (Bk).

Moreover, the reception device 200 determines that the lowest saturation color in the color change region within the multiple frames for a period corresponding to an optical signal format is black (Bk) in the non-emission period corresponding to a header when the condition that the brightness value is lower than a predetermined prescribed value only in the color change region within the corresponding number of frames to the non-emission period is not satisfied. As just stated, the reception device 200 can properly distinguish red (R), green (G), and blue (B) from black (Bk) by judging that the lowest saturation color is black (Bk).

Moreover, when the color change region within the multiple frames for a period corresponding to an optical signal format includes any of red (R), green (G), and blue (B) and black (Bk), in generating the frames, the reception device 200 controls the generation to start with the first frame among the multiple frames for a period corresponding to an optical signal format. As a result, the reception device 200 can acquire frames from a header part according to the optical signal format and easily acquire the information by decoding.

Moreover, the reception device 200 calculates and stores a red (R)–green (G) hue boundary value, a green (G)–blue (B) hue boundary value, and a blue (B)–red (R) hue boundary value according to the acquired red (R), green (G), and blue (B) hue values. As a result, the reception device 200 can properly distinguish the red (R), the green (G), and the blue (B) according to the actual environment.

The present disclosure is not confined to the above embodiment and various modifications and applications are available. For example, in the above-described embodiment, a case is described in which red (R), green (G), and blue (B) and black (Bk) are used in optical communication. However, other colors may be used. For example, like an optical signal format illustrated in FIG. 11, white (W) corresponding to the emission period and black (Bk) corresponding to the non-emission period may be used in optical communication. In such a case, the reception device 200 determiners whether a color change region within the multiple frames for a period corresponding to an optical signal format includes white (W) and black (Bk).

Figure 11:
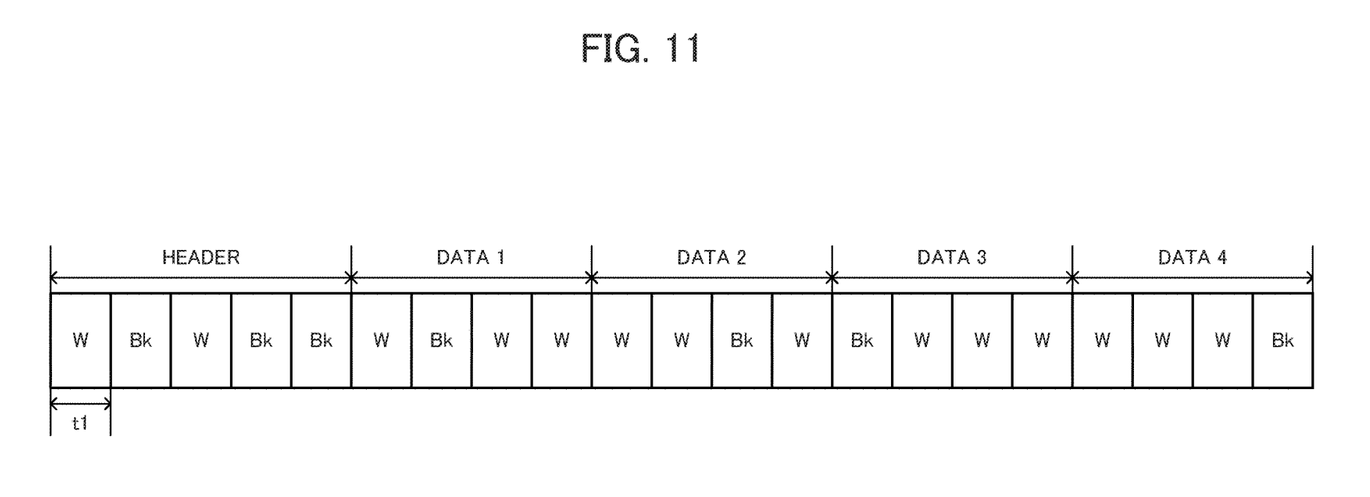
FIG. 11 is a chart illustrating another example of optical signal formats.

Moreover, in FIG. 11, not only the header but also data include black (Bk). However, two consecutive blacks (Bk) are present only in the header. Therefore, the reception device 200 can identify a header by distinguishing two-consecutive blacks (Bk).

Moreover, in the above-described embodiment, a case is described in which the first color is red (R), green (G), and blue (B) and the second color is black (Bk). However, the first color and the second color may be other colors. For example, when the first color is red (R) and the second color is green (G), the reception device 200 distinguishes between the red (R), which is the first color, and the green (G), which is the second color, by difference in hue.

Moreover, in the above-described embodiment, the change cycle t1 of light emitted by the transmission device 100 and the imaging cycle and the frame generation cycle, t2, of the reception device 200 are equal. However, t2 has only to be equal to or shorter than t1. For example, when the imaging cycle and the frame generation cycle, t2, of the reception device 200 are ½ of the change cycle t1 of light emitted by the transmission device 100, multiple frames for a period corresponding to an optical signal format are double in number the frames in the above-described embodiment.

Furthermore, acquiring multiple frames more than those for a period corresponding to an optical signal format, the reception device 200 can perform various kinds of processing such as judging whether a color change region within the frames includes any of red (R), green (G), and blue (B), which is the first color, and black (Bk) in the non-emission period corresponding to a header, which is the second color.

Moreover, in the above-described embodiment, in generating the frames, the reception device 200 controls the generation to start with the first frame among the multiple frames for a period corresponding to an optical signal format based on the stored header timing information. However, this is not restrictive. For example, the reception device 200 may control the imaging start timing to match the header timing in optical signals or the decoding to start with a header in optical signals based on the header timing information.

Moreover, the transmitter 114 within the transmission device 100 may be configured as, for example, part of the display.

Moreover, the reception device 200 may be any device as long as it is capable of capturing images. For example, the reception device 200 may be a personal handy-phone system (PHS), a personal digital assistant or personal data assistant (PDA), a tablet personal computer (PC), a game device, a portable music player, or the like.

Moreover, it may be possible to prepare a device comprising both the function of the reception device 200 and the function of the transmission device 100 and use both functions in a selective manner depending on the scene.

Moreover, in the above embodiments, the programs to be executed may be saved and distributed on a non-transitory computer-readable recording medium such as a flexible disc, a compact disc read-only memory (CD-ROM), a digital versatile disc (DVD), and a magneto-optical disc (MO), and installed to configure a system executing the above-described processing.

Moreover, the programs may be saved in a disc device or the like of a predetermined server on a network such as the Internet and, for example, superimposed on carrier waves and downloaded.

When the above functions are realized by an operation system (OS) in part or by cooperation of an OS and an application, only the non-OS part may be saved and distributed on a medium or downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An optical communication device, comprising:
   a controller which comprises a processor and is configured to perform operations including:
   acquiring images successively for a predetermined time; and
   determining, in a predetermined cycle, whether a predetermined image region in the acquired images includes either one of a first color that includes visible light information defined by a predetermined visible light communication system and a second color that does not include the visible light information.

2. The optical communication device according to claim 1, wherein the operations performed by the controller further include:
   when the controller determines that the predetermined image region in the acquired images includes either one of the first color and the second color, and changes of the first color occur in the predetermined image region in the acquired images, decoding the visible light information from the changes of the first color.

3. The optical communication device according to claim 1, wherein the controller determines whether the predetermined image region in the acquired images includes either one of the first color and the second color based on hue, brightness, and saturation of the predetermined image region in the acquired images.

4. The optical communication device according to claim 1, wherein the operations performed by the controller further include:
   controlling acquisition of the images when the controller determines that the predetermined image region in the acquired images includes either one of the first color and the second color.

5. The optical communication device according to claim 1, wherein the operations performed by the controller further include:
   determining a hue boundary for distinguishing the first color based on a hue value of the first color.

6. The optical communication device according to claim 3, wherein the controller determines that the predetermined image region in the acquired images includes the second color when a brightness value of a color of the predetermined image region in the acquired images is lower than a predetermined value.

7. The optical communication device according to claim 3, wherein the controller determines that the predetermined image region in the acquired images includes the second color when a number of the acquired images having a lowest brightness in the predetermined image region is equal to a predetermined number.

8. The optical communication device according to claim 4, wherein the controller controls the acquisition so that an appearance timing of the second color is a predetermined timing in optical signals.

9. The optical communication device according to claim 7, wherein, when the number of the acquired images having the lowest brightness in the predetermined image region is not equal to the predetermined number, the controller determines that the predetermined image region in the acquired images includes the second color when a number of the acquired images having a lowest saturation in the predetermined image region, among the acquired images having the lowest brightness in the predetermined image region, is equal to the predetermined number.

10. A method comprising:
    acquiring images successively for a predetermined time; and
    determining, in a predetermined cycle, whether a predetermined image region in the acquired images acquired includes either one of a first color that includes visible light information defined by a predetermined visible light communication system and a second color that does not include the visible light information.

11. The method according to claim 10, further comprising:
    when it is determined that the predetermined image region in the images includes either one of the first color and the second color, and changes of the first color occur in the predetermined image region in the acquired images, decoding the visible light information from the changes of the first color.

12. The method according to claim 10, wherein the determining comprises determining whether the predetermined image region in the acquired images includes either one of the first color and the second color based on hue, brightness, and saturation of the predetermined image region in the acquired images.

13. The method according to claim 10, further including:
    controlling acquisition of the images when it is determined that the predetermined image region in the acquired images includes either one of the first color and the second color.

14. The method according to claim 11, further comprising:
    determining a hue boundary for distinguishing the first color based on a hue value of the first color.

15. The method according to claim 13, further comprising:
    controlling the acquisition of the images so that an appearance timing of the second color is a predetermined timing in optical signals.

16. A non-transitory recording medium storing a computer-readable program for causing a computer to perform functions comprising:
    acquiring images successively for a predetermined time; and
    determining, in a predetermined cycle, whether a predetermined image region in the acquired images includes either one of a first color that includes visible light information defined by a predetermined visible light communication system and a second color that does not include the visible light information.

17. The non-transitory recording medium according to claim 16, wherein the determining comprises determining whether the predetermined image region in the acquired images includes either one of the first color and the second color based on hue, brightness, and saturation of the predetermined image region in the acquired images.

18. The non-transitory recording medium according to claim 16, wherein the functions further comprise:
controlling acquisition of the images in the image acquirer when the it is determined that the predetermined image region in the acquired images includes either one of the first color and the second color.

19. The non-transitory recording medium according to claim 16, wherein the functions further comprise:
determining a hue boundary for distinguishing the first color based on a hue value of the first color.

20. The non-transitory recording medium according to claim 18, wherein the functions further comprise:
controlling the acquisition of the images so that an appearance timing of the second color is a predetermined timing in optical signals.

* * * * *

UNITED STATES PATENT AND TRADEMARK OFFICE
CERTIFICATE OF CORRECTION

PATENT NO. : 10,218,439 B2
APPLICATION NO. : 15/684003
DATED : February 26, 2019
INVENTOR(S) : Masaaki Kikuchi Page 1 of 1

It is certified that error appears in the above-identified patent and that said Letters Patent is hereby corrected as shown below:

In the Claims

Column 13, Lines 5 and 6, Claim 18, Lines 3 and 4, delete "images in the image acquirer when the it" and insert -- images when it --.

Signed and Sealed this
Twenty-eighth Day of May, 2019

Andrei Iancu
*Director of the United States Patent and Trademark Office*